US009613388B2

United States Patent
Loss

(10) Patent No.: US 9,613,388 B2
(45) Date of Patent: Apr. 4, 2017

(54) METHODS, APPARATUSES AND COMPUTER PROGRAM PRODUCTS FOR THREE DIMENSIONAL SEGMENTATION AND TEXTURED MODELING OF PHOTOGRAMMETRY SURFACE MESHES

(71) Applicant: HERE Global B.V., Veldhoven (NL)

(72) Inventor: Leandro Augusto Loss, Newark, CA (US)

(73) Assignee: HERE GLOBAL B.V., Eindhoven (NL)

( * ) Notice: Subject to any disclaimer, the term of this patent is extended or adjusted under 35 U.S.C. 154(b) by 233 days.

(21) Appl. No.: 14/163,614

(22) Filed: Jan. 24, 2014

(65) Prior Publication Data

US 2015/0213572 A1 Jul. 30, 2015

(51) Int. Cl.
*G06T 17/05* (2011.01)
*G06T 1/00* (2006.01)
(Continued)

(52) U.S. Cl.
CPC .............. *G06T 1/0007* (2013.01); *G01C 11/04* (2013.01); *G06T 7/12* (2017.01); *G06T 15/02* (2013.01);
(Continued)

(58) Field of Classification Search
None
See application file for complete search history.

(56) References Cited

U.S. PATENT DOCUMENTS

2006/0061566 A1 3/2006 Verma et al.
2012/0321129 A1 12/2012 McLaughlin et al.
(Continued)

FOREIGN PATENT DOCUMENTS

GB           2457215 A    8/2009
WO    WO 2012/139249 A1    10/2012

OTHER PUBLICATIONS

Cheng, Liang, et al. "Dynamic triangle—Based method for 3D building rooftop reconstruction from LiDAR data." Geoinformatics, 2011 19th International Conference on. IEEE, 2011.*
(Continued)

*Primary Examiner* — Ryan M Gray
(74) *Attorney, Agent, or Firm* — Alston & Bird LLP

(57) ABSTRACT

An apparatus for generating 3D geographical models includes a processor and memory storing executable computer program code causing the apparatus to at least perform operations including removing points of a cloud depicting vertical structures in meshes of triangles detected in an area corresponding to a set of 3D points responsive to identifying triangles on vertical structures. The triangles include vertices corresponding to geocoordinates. The program code further causes the apparatus to interpolate non-vertical structures of triangles to generate a dense cloud of points. The program code further causes the apparatus to downward project delineated points of segmented rooftops to closest points of a ground to generate 3D polygonal models depicting geographical objects. The program code further causes the apparatus to generate texturized objects responsive to mapping triangle locations to the 3D polygonal models and assign texture to vertical structures and rooftops. Corresponding methods and computer program products are also provided.

20 Claims, 15 Drawing Sheets

(51) Int. Cl.

| | |
|---|---|
| G06T 15/02 | (2011.01) |
| G06T 15/04 | (2011.01) |
| G06T 17/10 | (2006.01) |
| G06T 17/20 | (2006.01) |
| G01C 11/04 | (2006.01) |
| G06T 7/12 | (2017.01) |

(52) U.S. Cl.
CPC .............. *G06T 15/04* (2013.01); *G06T 17/05* (2013.01); *G06T 17/10* (2013.01); *G06T 17/20* (2013.01); *G06T 2200/04* (2013.01); *G06T 2200/08* (2013.01); *G06T 2207/10028* (2013.01); *G06T 2207/20101* (2013.01); *G06T 2207/30184* (2013.01); *G06T 2215/06* (2013.01); *G06T 2219/2004* (2013.01)

(56) References Cited

U.S. PATENT DOCUMENTS

| | | | |
|---|---|---|---|
| 2013/0202197 A1* | 8/2013 | Reeler | G01S 17/89 382/154 |
| 2014/0198978 A1 | 7/2014 | Chen | |
| 2015/0081252 A1 | 3/2015 | Loss | |

OTHER PUBLICATIONS

Owen, Steven J. "A Survey of Unstructured Mesh Generation Technology." IMR. 1998.*

Verma, Vivek, Rakesh Kumar, and Stephen Hsu. "3D building detection and modeling from aerial LIDAR data." Computer Vision and Pattern Recognition, 2006 IEEE Computer Society Conference on. vol. 2. IEEE, 2006.*

Leininger, Brian, Richard E. Nichols, and Casey Gragg. "UrbanScape."Defense and Security Symposium. International Society for Optics and Photonics, 2007.*

Brenner, C., et al., "Rapid Acquisition of Virtual Reality City Models From Multiple Data Sources," In the Proceedings of ISPRS Commission V Symposium, Real-Time Imaging and Dynamic Analysis, Jun. 2-5, 1998, pp. 323-330, vol. 32, Part 5, Japan.

Dorninger, P., et al., "A Comprehensive Automated 3D Approach for Building Extraction, Reconstruction, and Regularization From Airborne Laser Scanning Point Clouds," Sensors, 2008, pp. 7323-7343, vol. 8, MDPI, Switzerland.

Gurram, P., et al., "3D Scene Reconstruction Through a Fusion of Passive Video and Lidar Imagery," In the Proceedings of the 36th Applied Imagery Pattern Recognition Workshop (AIPR), Oct. 10-12, 2007, pp. 133-138, IEEE Computer Society, USA.

Kada, M., "The 3D Berlin Project," In the Proceedings of Photogrammetric Week '09, Sep. 7-11, 2009, pp. 331-340. Fritsch, D. (Ed.), Wichmann-Verlag, Germany.

Ma, R., "Building Model Reconstruction From Lidar Data and Aerial Photograph, Dissertation, The Ohio State University," 2004, 166 pages, ProQuest Information and Learning Company, USA.

Milde, J., et al., "Building Reconstruction Using a Structural Description Based on a Formal Grammar," 2008, pp. 227-232, The International Archives of the Photogrammetry, Remote Sensing and Spatial Information Sciences, vol. 37, Part B3b, China.

Milde, J., et al., "Graph-Based Modeling of Building Rooftops," In the Proceedings of the 12th AGILE Conference on GIScience, Jun. 2-5, 2009, 5 pages, Germany.

Novacheva, A., "Building Roof Reconstruction From Lidar Data and Aerial Images Through Plane Extraction and Colour Edge Detection," 2008, pp. 53-57, The International Archives of the Photogrammetry, Remote Sensing and Spatial Information Sciences, vol. 37, Part B6b, China.

Park, J., et al., "Automatic Extraction of Large Complex Buildings Using Lidar Data and Digital Maps," In the Proceedings of ISPRS Commission III Photogrammetric Computer Vision PCV '06, Sep. 20-22, 2006, pp. 148-154, vol. 36, Part 3, Germany.

Sohn, G., et al., "Using a Binary Space Partitioning Tree for Reconstructing Polyhedral Building Models From Airborne Lidar Data," Photogrammetric Engineering & Remote Sensing, Nov. 2008, pp. 1425-1438, vol. 7, No. 11, American Society for Photogrammetry and Remote Sensing, USA.

Taillandier, F., "Automatic Building Reconstruction From Cadastral Maps and Aerial Images," The International Archives of the Photogrammetry, Remote Sensing and Spatial Information Sciences, Aug. 29-30, 2005, pp. 105-110, vol. 36, Part 3/W24, Austria.

Verma, V., et al., "3D Building Detection and Modeling From Aerial Lidar Data," In the Proceedings of the 2006 IEEE Computer Society Conference on Computer Vision and Pattern Recognition, CVPR'06, Jun. 17-22, 2006, pp. 2213-2220, IEEE, USA.

U.S. Appl. No. 14/028,069, Unpublished (filed Sep. 16, 2013) (Leandro Augusto Loss, Inventor).

Eichenlaub, Ronald, et al., "Fidelity at High Speed: Wireless Insite® Real Time Module™", Military Communications Conference, Nov. 16, 2008, pp. 1-7, IEEE, USA.

Khoshelham, Kourosh, et al., "A Split-and-Merge Technique for Automated Reconstruction of Roof Planes", Photogrammetric Engineering & Remote Sensing, Jul. 2005, pp. 855-862, vol. 71, No. 7, ASPRS—The Imaging & Geospatial Information Society, USA.

Sun, Shaohui, et al., "Aerial 3D Building Detection and Modeling From Airborne LiDAR Point Clouds", IEEE Journal of Selected Topics in Applied Earth Observations and Remote Sensing, Jun. 2013, pp. 1440-1449, vol. 6, No. 3, IEEE, USA.

Triebel, Rudolph, et al., "Robust 3D Scan Point Classification using Associative Markov Networks", Proceeding of the 2006 IEEE International Conference on Robotics and Automation, May 2006, pp. 2603-2608, IEEE, USA.

Wang Shugen, et al., "Simple Building Reconstruction from Lidar Data and Aerial Imagery", $2^{nd}$ International Conference on Remote Sensing, Environment and Transporation Enginerring, Jun. 2012, 5 pages, IEEE, USA European Patent Office, Extended European Search Report for Application No. 14184341.7, Feb. 4, 2015, 12 pages, Germany.

Cheng, Liang et al., "Dynamic Triangle—Based Method For 3D Building Rooftop Reconstruction From LiDAR Data", In the Proceedings of the 19th International Conference on Geoinformatics, Jun. 24, 2011, pp. 1-4, IEEE, USA.

Frueh, C., et al., "Constructing 3D City Models by Merging Ground-Based and Airborne Views", In the Proceedings of IEEE Computer Society Conference on Computer Vision and Pattern Recognition, Jun. 18-20, 2003, pp. 562-569, vol. 2, IEEE, USA.

Nex F., et al., "Automatic Roof Outlines Reconstruction From Photogrammetric DSM", *ISPRS Annals of the Photogrammetry, Remote Sensing and Spatial Information Sciences*, vol. I-3, 2012, pp. 257-262, Retrieved from <http://www.isprs-ann-photogramm-remote-sens-spatial-inf-sci.net/I-3/257/2012/isprsannals-I-3-257-2012.pdf> on May 4, 2015.

You, Suya, et al., "Urban Site Modeling from LiDAR", *Lecture Notes In Computer Science*, 2003, pp. 579-588, vol. 2669, Springer-Verlag, Germany.

International Searching Authority, International Search Report and Written Opinion for International Application No. PCT/EP2015/050520, May 12, 2015, 12 pages, European Patent Office, The Netherlands.

Hung, Hsiao-Chu, et al., "Building Boundary Extraction from Lidar Data", The $33^{rd}$ Asian Conference on Remote Sensing, Nov. 26-30, 2012, 8 pages, Pattaya, Thailand.

* cited by examiner

METHODS, APPARATUSES AND COMPUTER PROGRAM PRODUCTS FOR THREE DIMENSIONAL SEGMENTATION AND TEXTURED MODELING OF PHOTOGRAMMETRY SURFACE MESHES

TECHNOLOGICAL FIELD

An embodiment of the invention relates generally to three dimensional location services and, more particularly, relates to a method, apparatus, and computer program product for generating texturized three dimensional models of geographical areas.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to three dimensional (3D) city modeling.

At present, reconstruction and display of 3D city models are generally important parts of next generation mapping systems, and 3D location and content services. Due to the number of constructions in an urban scene, manual modeling of urban objects may be expensive and time consuming. As such, automatic methods have been in high demand. Automatic computation of 3D city models has, in general, explored two different sources of data: (i) stereo photogrammetric imagery; and (ii) 3D sensors acquiring a 3D cloud of points. In this regard, some entities involved with city modeling have given the 3D city modeling field a new branch for realistic visualization. By collecting aerial imaging data, entities are able to produce detailed 3D views of urban scenes that may be composed of 3D meshes of triangles that are geo-referenced. Although realistic, such triangle meshes typically lack any information about objects in urban scenes, such as buildings, houses and the like. As such, at present, triangle meshes are very limited in usability and are used today as an isolated layer that serves only for visualization.

Automatic segmentation and modeling of urban objects from photogrammetry models may substantially increase the usability of triangle meshes by adding information that may allow for cross-referencing between different sources of data, reducing time and effort of specialized personnel. It may also increase coverage of current 3D maps for leveraging state-of-the-art photogrammetry modeling used by many location companies in today's market. However, at present, the broad academic research in the field indicates that the automatic generation of 3D city models may have been mainly based on low-throughput and expensive data collection, which may cause problems associated with limited coverage and extreme computational demand.

Current solutions to 3D segmentation and modeling of urban scenes may typically explore clouds of points created from specialized equipment such as laser sensors (e.g., Light Detection and Ranging (LiDAR)) installed on the bottom of an airborne entity (e.g., an airplane). In addition to being expensive, such specialized equipment has a very low throughput, which affects scalability over large portions of terrain. Referring to a dictionary of predefined shapes, modeling methods employ parametric approaches that optimize fitting between predefined models and the collected 3D data. For instance, shapes to be optimized may vary from low-level details such as lines and planes. At present, existing parametric approaches are limited to sensitive parameter setting and predefined shapes which typically require extreme computational demand. As such, at present, parametric approaches for reconstruction of 3D city models may be difficult to scale across cities with different architecture.

In view of the foregoing drawbacks, it may be desirable to provide an efficient and accurate mechanism for generating three dimensional geographical models based on photogrammetry imagery models.

BRIEF SUMMARY

A method, apparatus and computer program product are therefore provided for generating texturized three dimensional segmented models for geographic areas. In this regard, an example embodiment may utilize a 3D photogrammetry mesh of textured triangles as input for reconstructing models for 3D geographic areas (e.g., urban areas (e.g., cities)) in a non-parametric (e.g., non-usage of predefined shapes of a dictionary to fit on collected data) and non-iterative (e.g., deterministic) manner.

As such, an example embodiment may facilitate interpolating geo-referenced vertices of textured 3D photogrammetry triangle meshes (or any other surface polygon meshes) and reconstructing textured 3D geographical models (e.g., urban models) by inquiring about the proximity and nature of neighboring 3D points.

Starting from a triangular photogrammetric model, vertices may be interpolated by an example embodiment. In other words, points may be generated to fill in the 3D triangle(s) defined by three vertices. As such, generating points to fill in the 3D triangle defined by three vertices may result in a denser point cloud. Additionally, by inquiring about the proximity and nature of neighboring 3D points, a wall(s), a rooftop(s) and the ground may be segmented, clustered and labeled accordingly by an example embodiment. Moreover, future increases in resolution resulting from advances in photogrammetric imagery acquisition may produce tighter triangular meshes, and as a result, this interpolation technique may be bypassed in an alternative example embodiment.

In one example embodiment, a local vicinity may be rapidly assessed through the encoding of the interpolated 3D points in an octree (e.g., an indexed 3D parenthood tree/diagram). By computing the outline of rooftops and projecting the rooftops down to ground level, detailed reconstructions of 3D geographical (e.g., urban) areas in an extremely computationally efficient manner may be produced by an exemplary embodiment. Since this process may potentially fragment buildings by segmenting a rooftop part(s) at different heights, an additional merging technique may be employed. In addition, an example embodiment may generate a parenthood tree and perform a post-check on the 3D models to combine parts that may be occasionally split.

By taking advantage of the texturized photogrammetric input, an example embodiment may geographically match/map triangle locations (e.g., triangle texture locations) and building models to generate textured 3D geographic (e.g., urban) models with high detail and quality accuracy. As a result, an example embodiment may produce segmented textured 3D geographical (e.g., urban) models that aggregate information about the nature of objects in a scene (e.g., buildings, houses, etc.) which may be used to cross-reference other databases (e.g., touristic information, historical data, points of interest (POIs), etc.).

In one example embodiment, a method is provided for generating texturized 3D geographical models. The method may include removing one or more three dimensional points of a cloud depicting vertical structures in one or more meshes of three dimensional triangles detected in a geographic area corresponding to a set of three dimensional points of the cloud in response to identifying corresponding triangles lying on the vertical structures. Each of the three dimensional triangles may include three vertices corresponding to geocoordinates of the geographic area. The method may further include interpolating non-vertical structures of the three dimensional triangles to generate additional three dimensional points of the cloud to generate a dense cloud of three dimensional points. The method may further include downward projecting delineated points of segmented rooftops to respective closest points of a subset of the points of the cloud representing a ground to generate one or more three dimensional polygonal models depicting three dimensional geographical objects. The method may further include generating a texturized set of the three dimensional geographic objects in response to mapping triangle texture locations of the meshes to corresponding locations in the three dimensional polygonal models and assigning at least one texture to the vertical structures and to the rooftops.

In another example embodiment, an apparatus is provided for generating texturized 3D geographical models. The apparatus may include a processor and a memory including computer program code. The memory and computer program code are configured to, with the processor, cause the apparatus to at least perform operations including removing one or more three dimensional points of a cloud depicting vertical structures in one or more meshes of three dimensional triangles detected in a geographic area corresponding to a set of three dimensional points of the cloud in response to identifying corresponding triangles lying on the vertical structures. Each of the three dimensional triangles may include three vertices corresponding to geocoordinates of the geographic area. The memory and computer program code are further configured to, with the processor, cause the apparatus to interpolate non-vertical structures of the three dimensional triangles to generate additional three dimensional points of the cloud to generate a dense cloud of three dimensional points. The memory and computer program code are further configured to, with the processor, cause the apparatus to downward project delineated points of segmented rooftops to respective closest points of a subset of the points of the cloud representing a ground to generate one or more three dimensional polygonal models depicting three dimensional geographical objects. The memory and computer program code are further configured to, with the processor, cause the apparatus to generate a texturized set of the three dimensional geographic objects in response to mapping triangle texture locations of the meshes to corresponding locations in the three dimensional polygonal models and assigning at least one texture to the vertical structures and to the rooftops.

In yet another example embodiment, a computer program product is provided for generating texturized 3D geographical models. The computer program product includes at least one computer-readable storage medium having computer-readable program code portions stored therein. The computer-executable program code instructions may include program code instructions configured to remove one or more three dimensional points of a cloud depicting vertical structures in one or more meshes of three dimensional triangles detected in a geographic area corresponding to a set of three dimensional points of the cloud in response to identifying corresponding triangles lying on the vertical structures. Each of the three dimensional triangles may include three vertices corresponding to geocoordinates of the geographic area. The program code instructions may also interpolate non-vertical structures of the three dimensional triangles to generate additional three dimensional points of the cloud to generate a dense cloud of three dimensional points. The program code instructions may also downward project delineated points of segmented rooftops to respective closest points of a subset of the points of the cloud representing a ground to generate one or more three dimensional polygonal models depicting three dimensional geographical objects. The program code instructions may also generate a texturized set of the three dimensional geographic objects in response to mapping triangle texture locations of the meshes to corresponding locations in the three dimensional polygonal models and assigning at least one texture to the vertical structures and to the rooftops.

BRIEF DESCRIPTION OF THE SEVERAL VIEWS OF THE DRAWINGS

Figure 1:
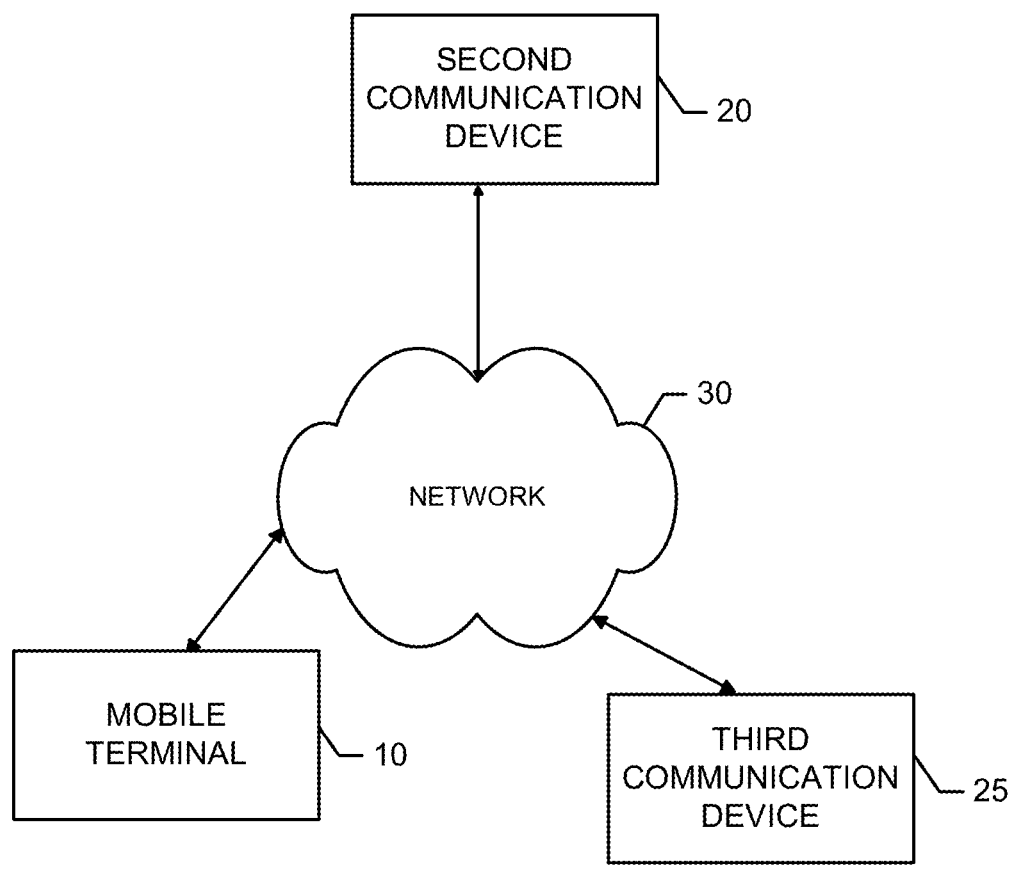
Figure 2:
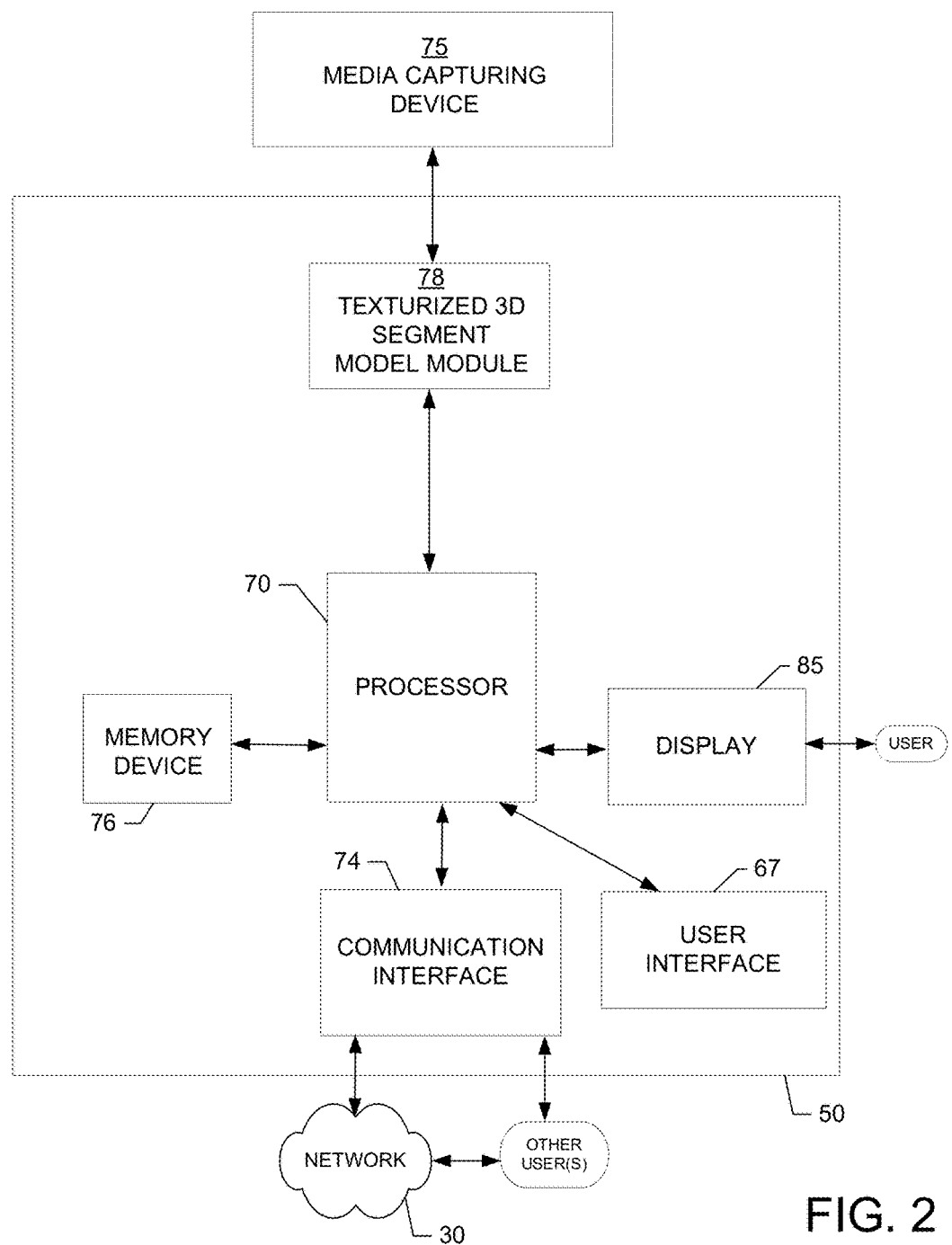
Figure 3:
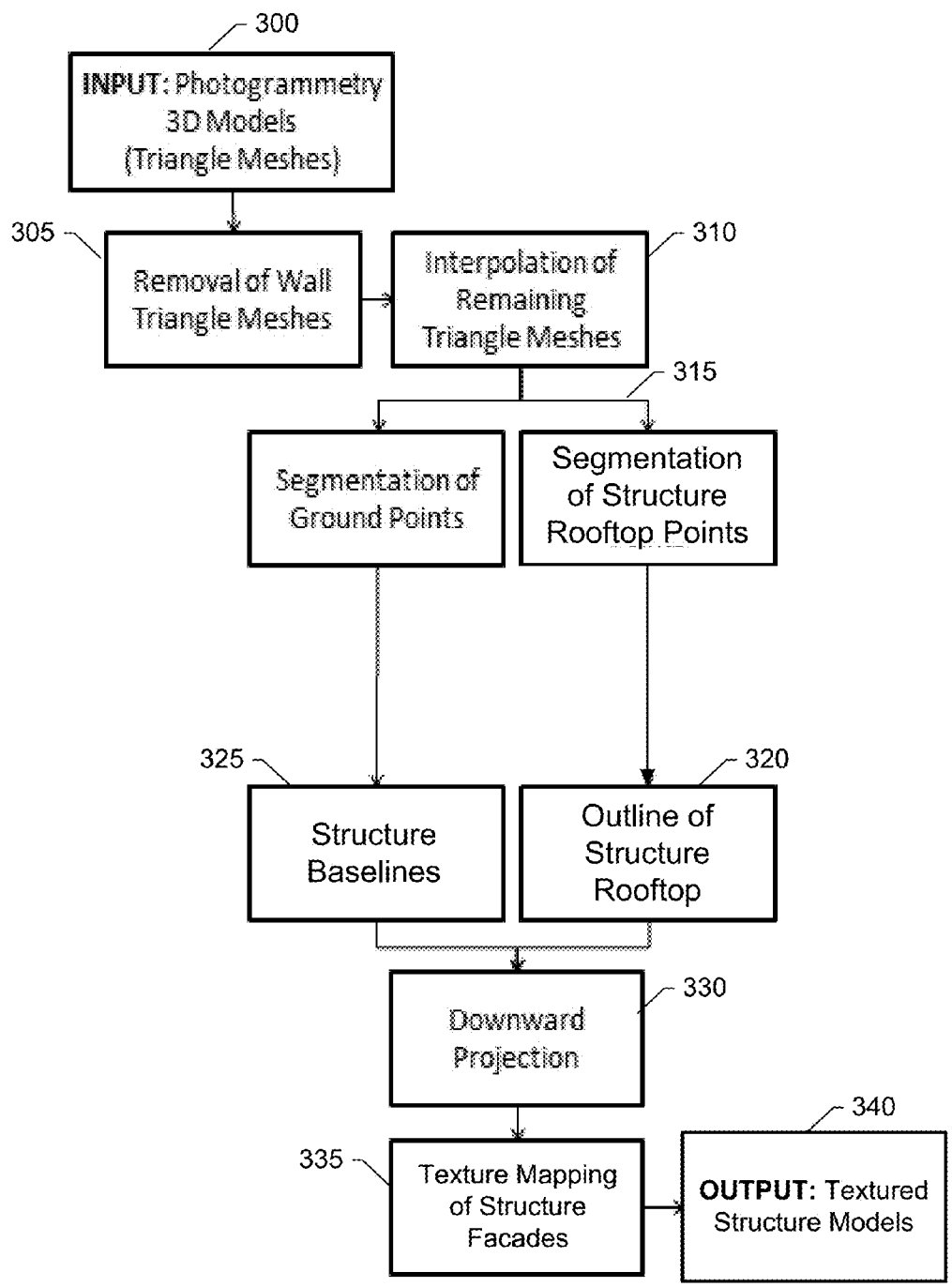
Figure 4:
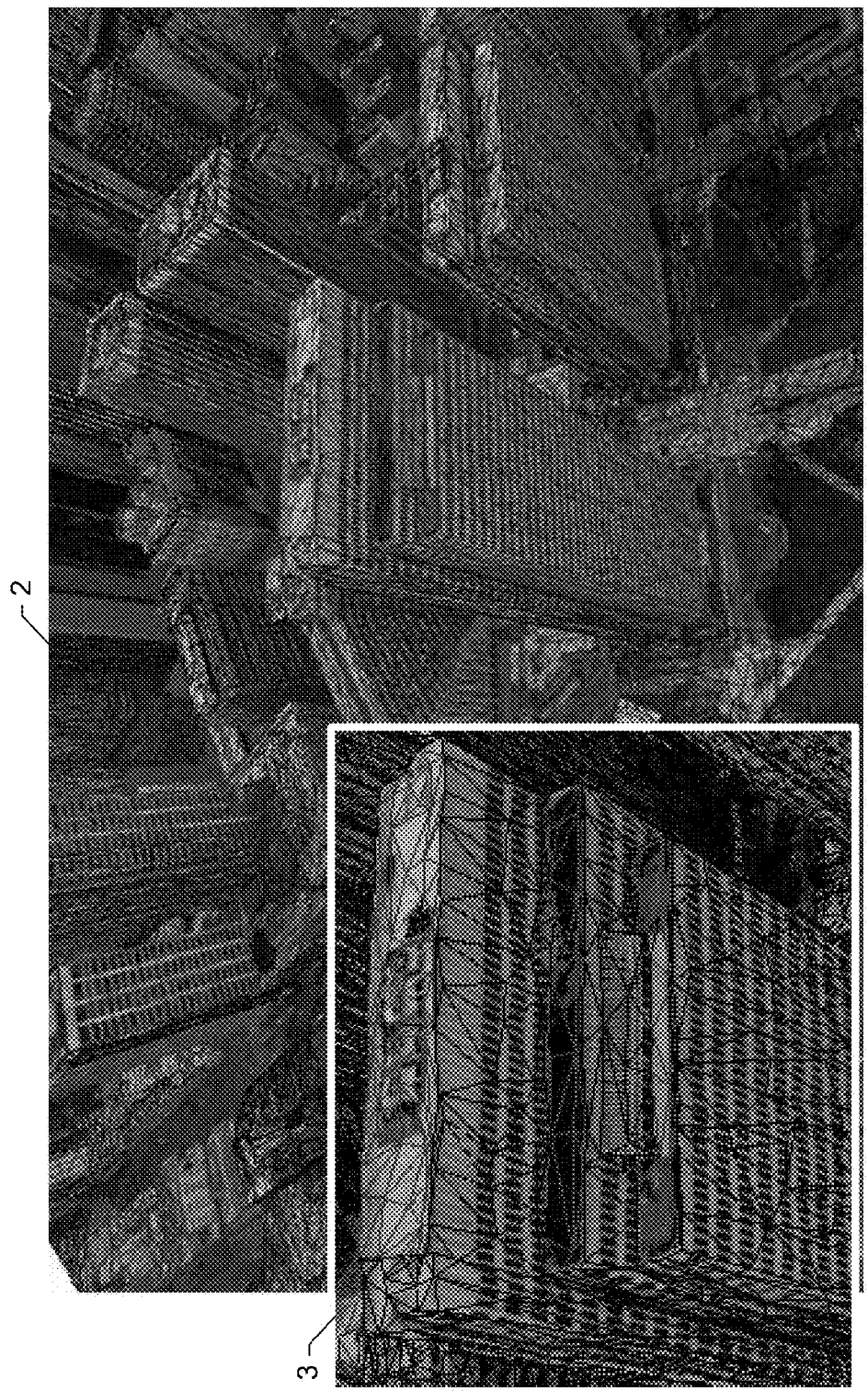
Figure 5:
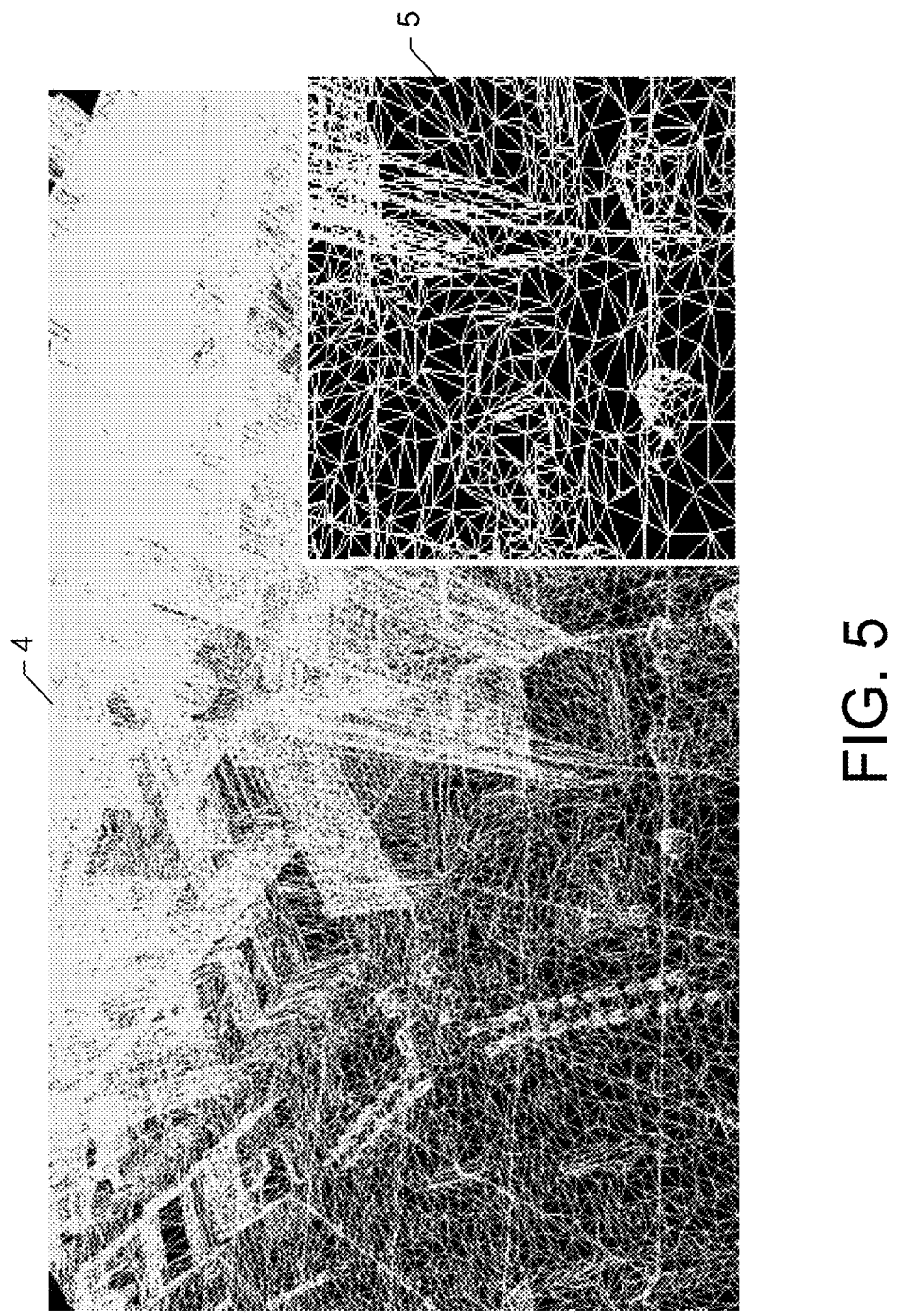
Figure 6:
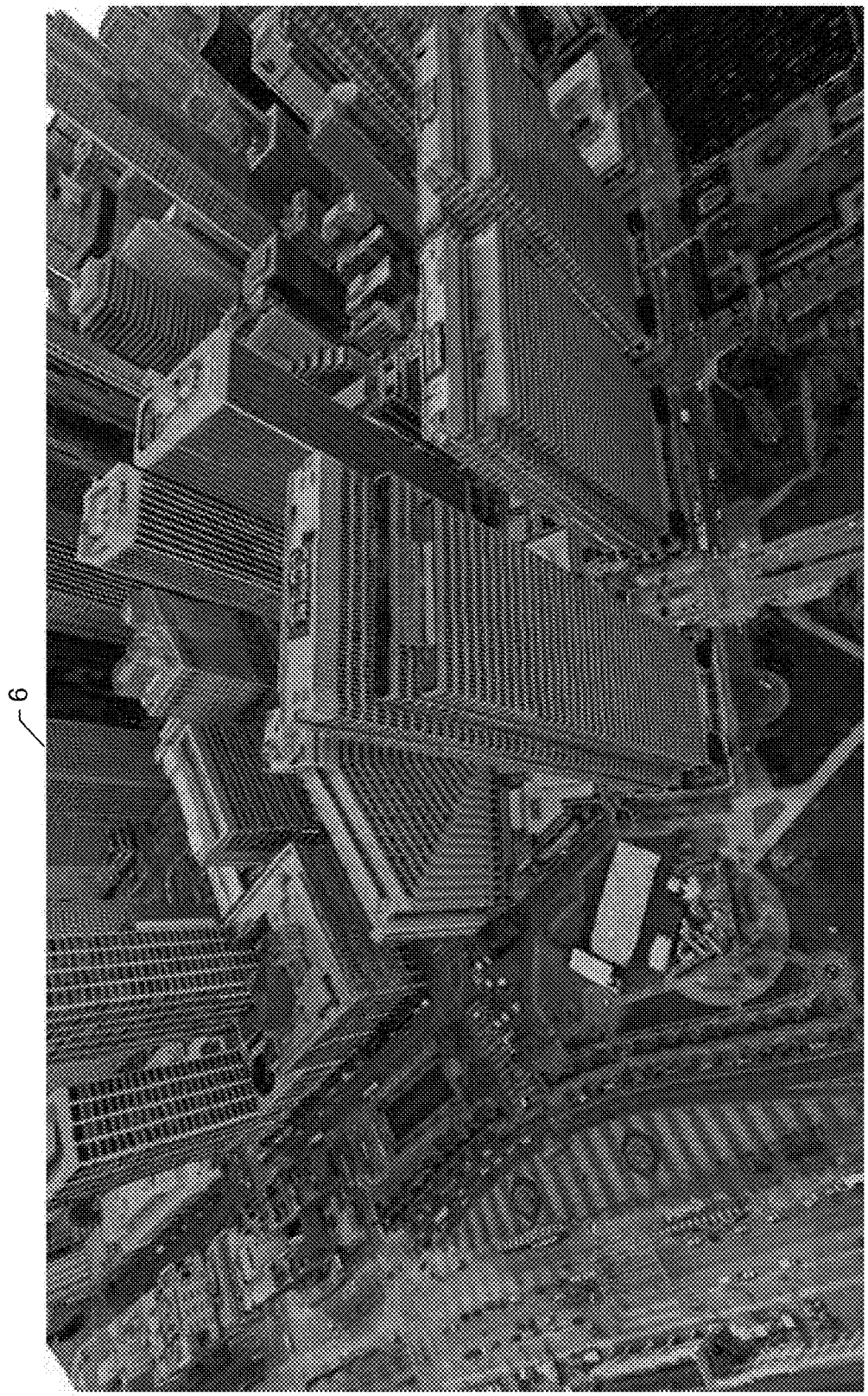
Figure 7:
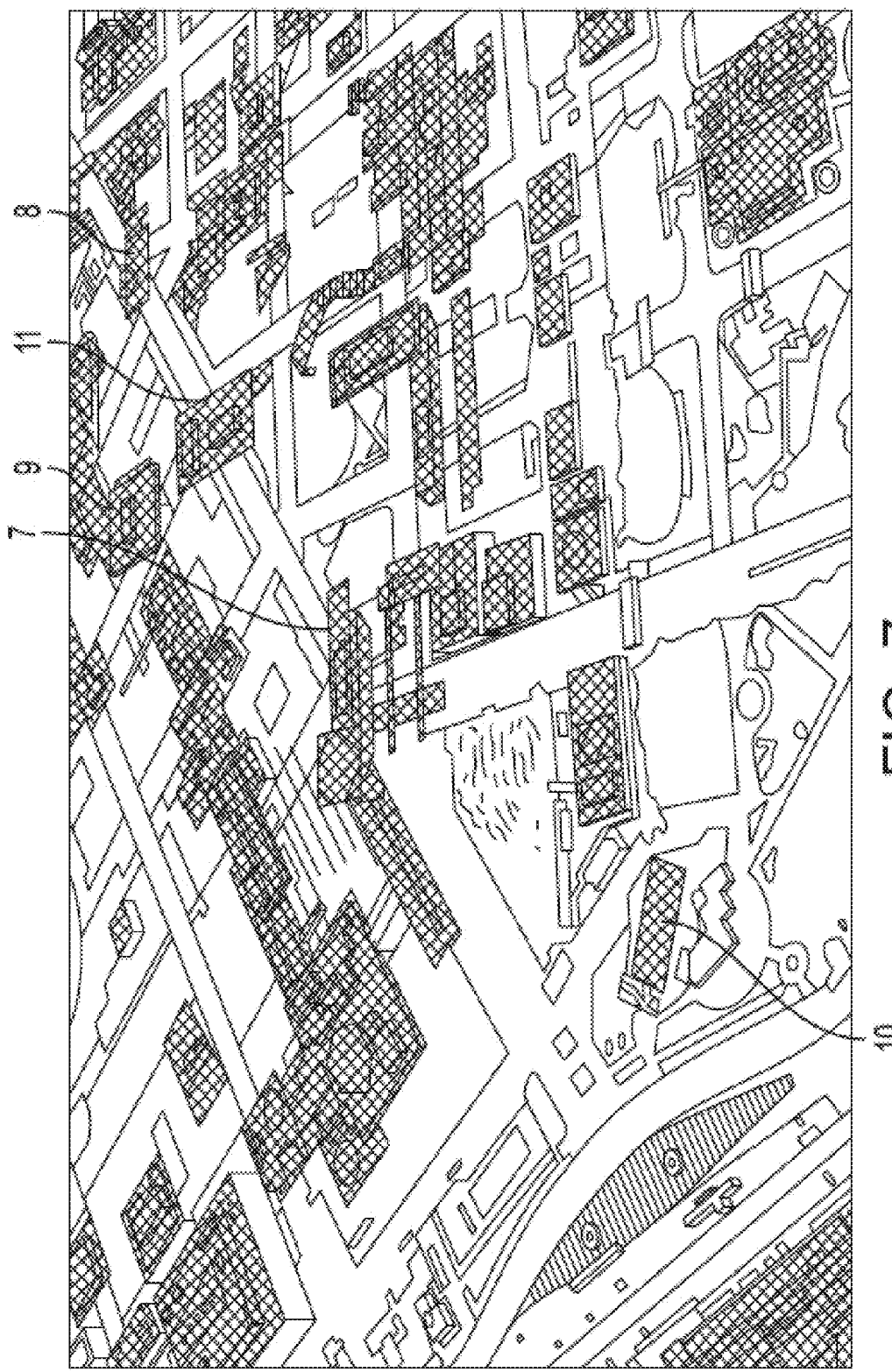
Figure 8:
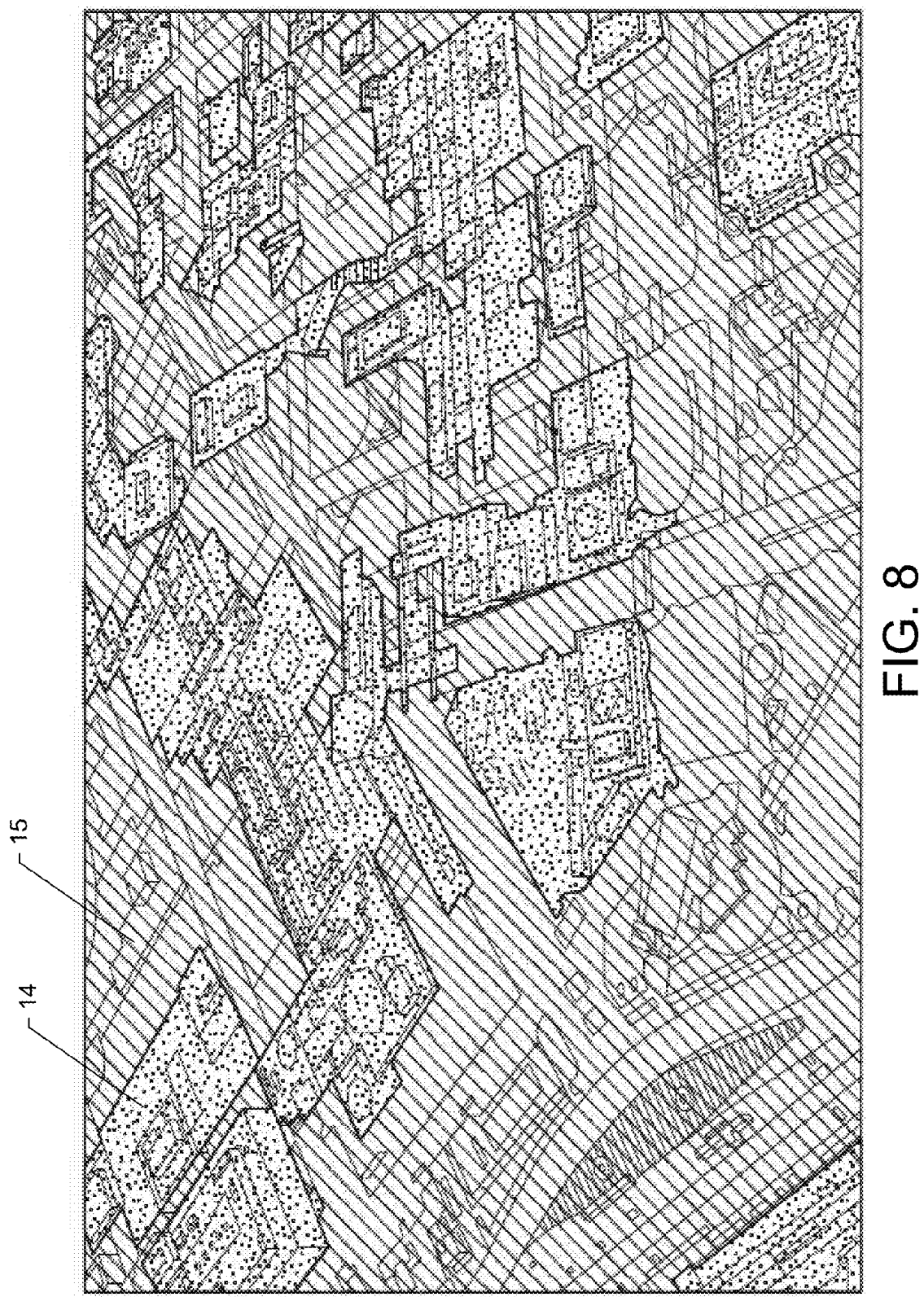
Figure 9:
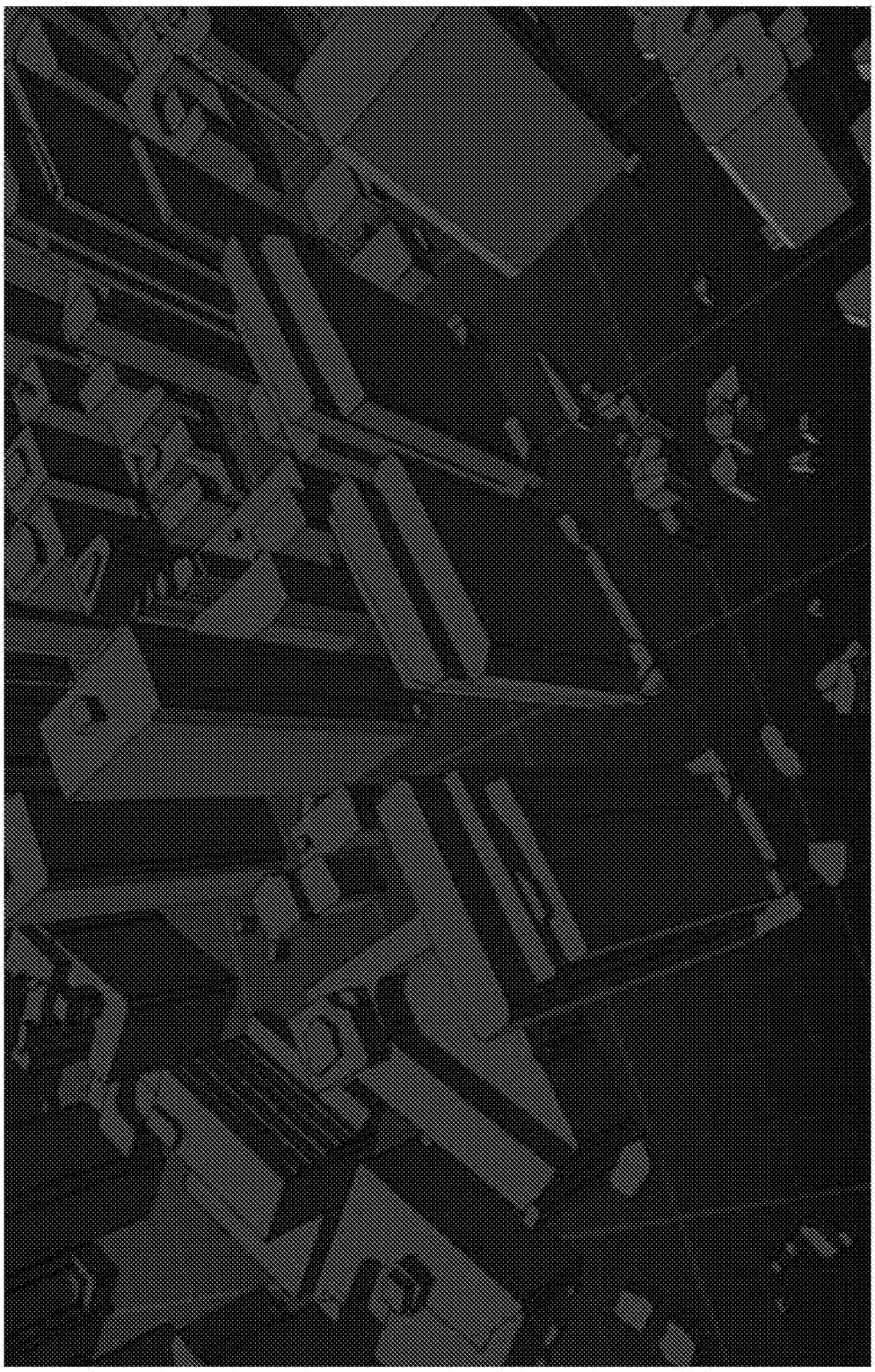
Figure 10:
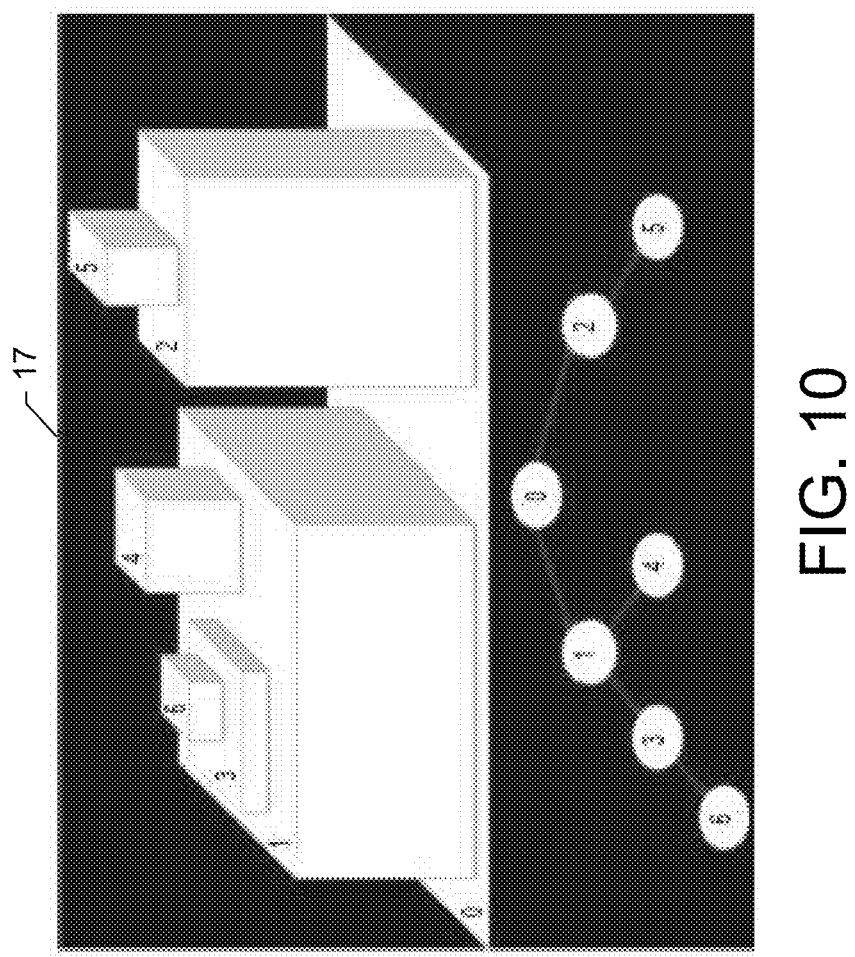
Figure 11:
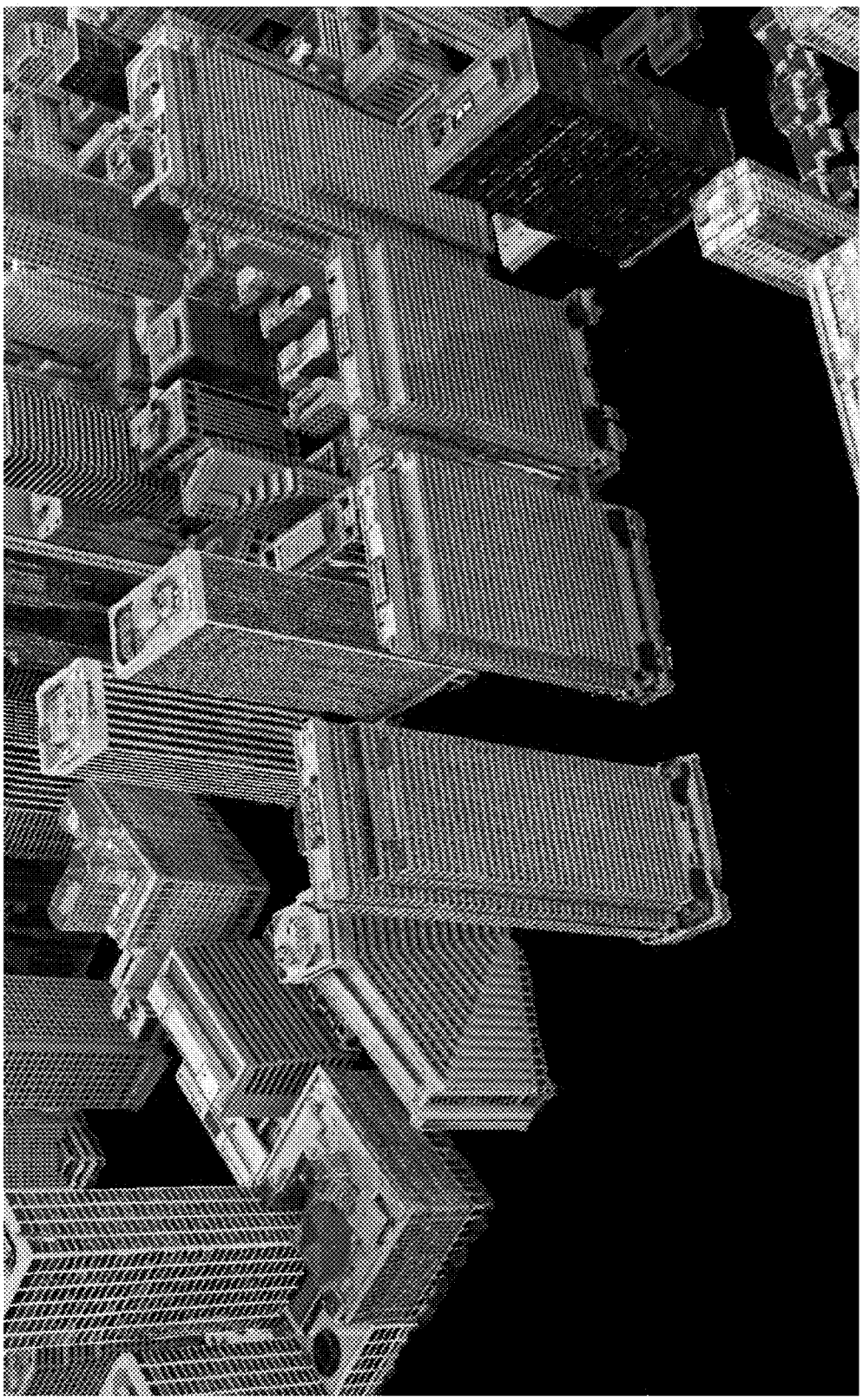
Figure 12:
Figure 13:
Figure 14:
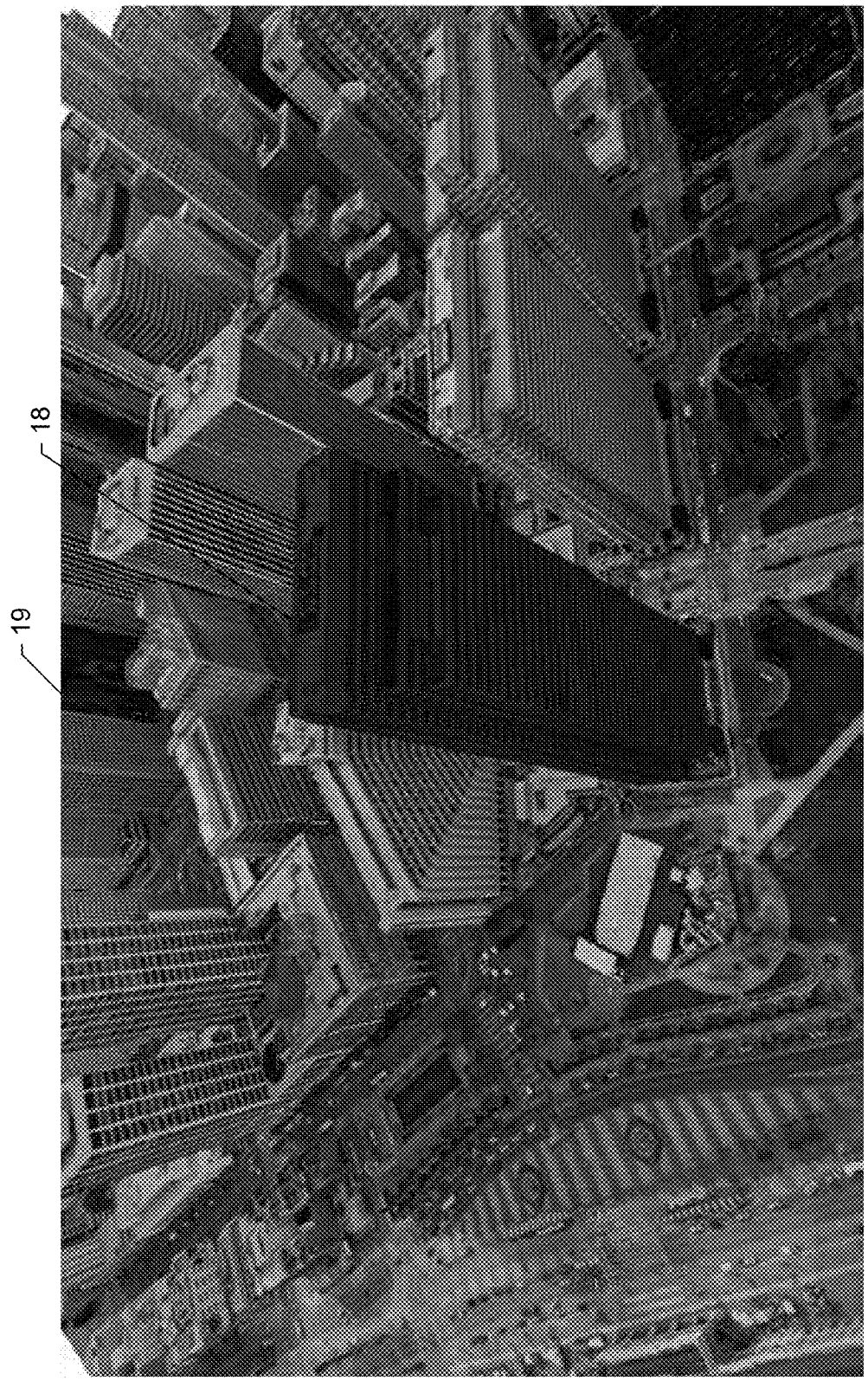
Figure 15:
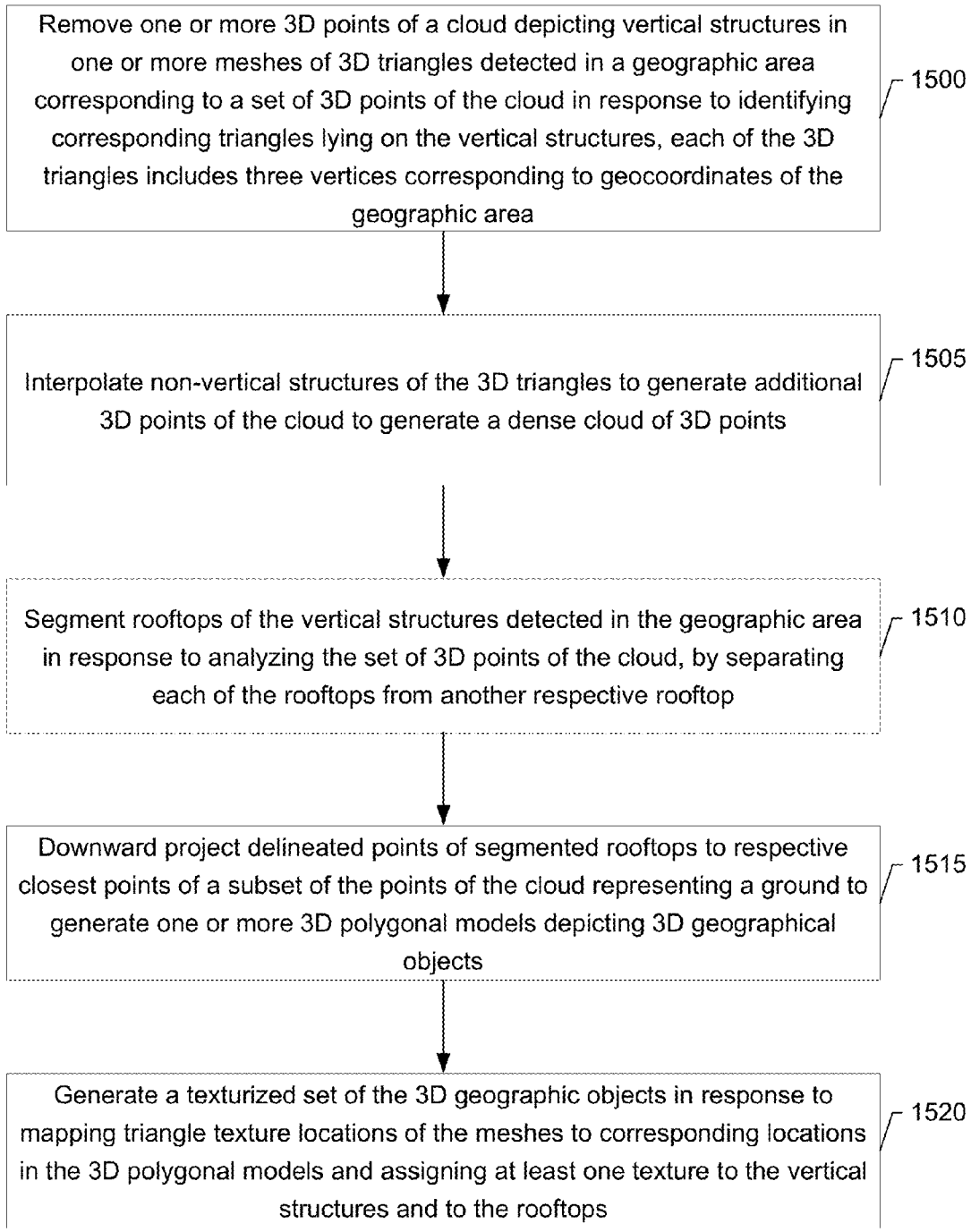

Having thus described some embodiments of the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a diagram of a flowchart illustrating segmentation of photogrammetry 3D models;

FIG. 4 is a diagram illustrating a textured version of triangle meshes in FIG. 5 and includes a box showing a closer view of the photogrammetry model;

FIG. 5 is a diagram illustrating the photogrammetry 3D models shown in FIG. 4 without the matching textures, in which triangle meshes are placed side-by-side, draping over the urban landscape and in which a small box is included showing details of the photogrammetry models;

FIG. 6 is a diagram illustrating an interpolated point cloud from triangle meshes in FIG. 4;

FIG. 7 is a diagram illustrating results from interpolating triangle meshes after removing triangle meshes whose normal directions are perpendicular within a tolerance margin to the vertical axis;

FIG. 8 is a diagram illustrating the resulting segmentation of the ground and rooftop points;

FIG. 9 is a diagram illustrating the models from down projecting rooftop outlines to ground level;

FIG. 10 is a diagram illustrating a parenthood tree with encoded relationships between architectural details from rooftops;

FIG. 11 is a diagram illustrating the result of texturizing models based on relative geographic location of mesh triangles and modeled walls and rooftops;

FIG. 12 is a diagram illustrating a result of texturizing models in San Francisco, Calif.;

FIG. 13 is a diagram illustrating a close up view of the texturized models in San Francisco, Calif.;

FIG. 14 is a diagram illustrating a structure being selected for further matching with location services and databases; and FIG. 15 illustrates a flowchart for generating texturized 3D geographic models according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As used herein, the terms "cloud," "point cloud," and similar terms may be used interchangeably to refer to a set of 3D points (also referred to herein as points) including spatial coordinates (e.g., latitude, longitude and altitude coordinates) corresponding to a geographical area.

FIG. 1 illustrates a generic system diagram in which a device such as a mobile terminal 10 is shown in an exemplary communication environment. As shown in FIG. 1, an embodiment of a system in accordance with an example embodiment of the invention may include a first communication device (e.g., mobile terminal 10) and a second communication device 20 capable of communication with each other via a network 30. An example embodiment of the invention may further include one or more additional communication devices, one of which is depicted in FIG. 1 as a third communication device 25. In one embodiment, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations that are part of one or more cellular or mobile networks or one or more access points that may be coupled to a data network, such as a Local Area Network (LAN), a Metropolitan Area Network (MAN), and/or a Wide Area Network (WAN), such as the Internet. In addition, the mobile terminal 10 and the second and third communication devices 20 and 25 may be in communication with each other via the network 30 and each may receive photogrammetry imagery data from a media capturing device of an aerial system (e.g., an airplane, a helicopter, a satellite, etc.) capturing aerial photogrammetry imagery data of a geographical area(s) (e.g., urban area(s) (e.g., a city)). The photogrammetry imagery data may include one or more meshes that may include 3D triangles defined by three vertices that may be geo-located (e.g., latitude, longitude and altitude coordinates). Each of the triangles may be assigned to a texture patch computed by the mobile terminal 10, and/or the second and third communication devices 20 and 25 from the input of the photogrammetry imagery data, as described more fully below.

In addition, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus for generating texturized 3D segmented models of geographic areas according to an example embodiment of the invention. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, an embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, and a texturized 3D segment model module 78. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.).

The memory device 76 may store a cloud(s) (e.g., a group or set) of 3D points (also referred to herein as a point cloud). Each of the 3D points of a point cloud may include geo-coded information that may be associated with location information corresponding to coordinates such as, for example, latitude, longitude and/or altitude coordinates of real-world objects. The geo-coded information may be evaluated by the processor 70 and/or the texturized 3D segment model module 78.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control a texturized 3D segment model module 78. As such, in one embodiment, the processor 70 may be said to cause, direct or control the execution or occurrence of the various functions attributed to the texturized 3D segment model module 78, as described herein. The texturized 3D segment model module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the texturized 3D segment model module 78, as described herein. Thus, in examples in which software is employed, a device or circuitry (e.g., the processor 70 in one example) executing the software forms the structure associated with such means.

In an example embodiment, the texturized 3D segment model module 78 may generate a 3D geographic model(s) (e.g., a 3D urban (e.g., city) model(s)) based in part on analyzing photogrammetry imagery data and/or 3D models generated from imagery (e.g., one or more captured photographs, videos), as described more fully below. In one example embodiment, the photogrammetry imagery data may be received from a media capturing device 75 of an aerial system (e.g., airplane, helicopter, satellite, etc.).

The media capturing device 75 (e.g., a camera) may be part of an aerial system (e.g., airplane, helicopter, satellite, etc.) and may capture 3D photogrammetry imagery content (e.g., images, video, etc.) of a geographical area (e.g., an urban area(s) (e.g., a city)) as the aerial system flies above, hovers over or orbits above the geographical area. The photogrammetry imagery content may include one or more meshes that may include 3D triangles defined by three vertices that may be geo-located (e.g., latitude, longitude and altitude coordinates).

Referring to FIG. 3, a diagram illustrating a method of segmentation of photogrammetry 3D models according to an example embodiment is provided. At operation 300, an apparatus (e.g., texturized 3D segment model module 78) may receive or otherwise process input of (i) a set of photogrammetry imagery (e.g., images, video(s)) that may include one or more 3D photogrammetry surface meshes captured by a media capturing device (e.g., media capturing device 75) of an aerial system while flying above, hovering over, or orbiting above, a geographical area (e.g., an urban area, a city, etc.) or (ii) 3D models resulting from computing structure based in part on motion. For example, 3D models may be estimated, by the texturized 3D segment model module 78 and/or processor 70, from two dimensional (2D) images or video sequences through the observation of common movement among pixels, which reveals the underlying surface. Since this process may be computational demanding, in an example embodiment the texturized 3D segment model module 78 may utilize/observe only a subset of the input pixels, which may initially produce a rather sparse mesh of triangles instead of a dense cloud of points. An example of 3D photogrammetry models 2 received as input (e.g., captured from a media capturing device 75 of an aerial system) or otherwise processed (e.g., accessed/retrieved via memory device 76) by the texturized 3D segment model module 78 is shown in FIG. 4. The example embodiment of FIG. 4 illustrates the textured version of triangle meshes in FIG. 5 and includes a box 3 showing a closer view of a 3D photogrammetry model. In an example embodiment, the textured version of the triangle meshes may be associated with information such as, for example, color or other detail information associated with the triangle meshes.

The one or more 3D photogrammetry surface meshes (also referred to herein as photogrammetry meshes or meshes) may include 3D triangles (e.g., 3D triangle meshes) defined by three vertices that may be geo-located (e.g., latitude, longitude, and altitude coordinates). For example, FIG. 5 illustrates the photogrammetry 3D models 4, which are shown in FIG. 4, without matching textures (e.g., without color or other detail information). In the example embodiment of FIG. 5, the triangle meshes are placed side-by-side, by the texturized 3D segment model module 78, draping over the urban landscape and the box 5 illustrates details of the 3D photogrammetry models. Since the photogrammetry 3D models 4 are without matching textures the data associated with the three vertices of the triangle meshes may initially be sparse. As such, interpolation of vertices of triangles may be performed to generate additional points of a 3D point cloud to obtain a dense 3D point cloud, as described more fully below. Additionally, each of the triangles of the meshes may be assigned, by the texturized 3D segment model module 78, to a texture patch computed from the input photogrammetry imagery.

At operation 305, an apparatus (e.g., texturized 3D segment model module 78) may perform wall segmentation (e.g., on one or more structures (e.g., buildings)) in one or more meshes of 3D triangles by labeling mesh triangles lying on vertical structures, as shown in FIG. 7. The separation or removal of the walls of structures (e.g., buildings), by the texturized 3D segment model module 78, may make rooftops denoted by visible indicia in FIG. 7 (e.g., cross-hatching (e.g., rooftops 7, 8, 9, 10 and 11)) appear to float in the air.

The walls (e.g., walls of structures (e.g., buildings)) may be removed, by the texturized 3D segment model module 78, based on computation of the normal direction of the 3D triangles of the meshes. In this regard, the texturized 3D segment model module 78 may analyze and compute the cross-product between two vectors formed by connecting one of the triangle vertices to the other two triangle vertices of the meshes. In this regard, triangles determined by the texturized 3D segment model module 78 to have normal direction perpendicular to the vertical axis (e.g., (0, 0, 1)) within a predetermined angular margin (e.g., 30 degrees) may be labeled (e.g., designated with identifying indicia (e.g., a color, a name, assigned a value, etc.)) and segmented, by the texturized 3D segment model module 78, from the other triangles of meshes. The texturized 3D segment model module 78 may utilize different methodologies in order to remove walls (e.g., walls of structures (e.g., buildings)) without departing from the spirit and scope of the invention. For example, the texturized 3D segment model module 78 may traverse the triangle vertices and segment the triangles that lie directly underneath top triangles in a maximum projection fashion to segment the walls.

At operation 310, an apparatus (e.g., texturized 3D segment model module 78) may interpolate non-vertical triangle vertices to produce a dense 3D point cloud (e.g., additional 3D points) from a geographic area(s) of photogrammetry imagery. In this regard, in an example embodiment, the texturized 3D segment model module 78 may create a dense cloud of points (e.g., 3D points) in a deterministic way by computing/determining a centroid of the three vertices of the 3D triangles and equidistantly subdividing the lines connecting the three vertices to one another and to the centroid, which may create additional 3D points of a cloud.

As an example of a dense 3D point cloud, consider FIG. 6 which illustrates a diagram 6 of an interpolated point cloud from triangle meshes of a 3D photogrammetry model(s) of a geographic area (e.g., an urban area) in FIG. 4. In the example embodiment of FIG. 6, the 3D photogrammetry model(s) illustrates the San Francisco Financial district Referring back to FIG. 7, a diagram illustrating the results of the texturized 3D segment model module 78 interpolating meshes after removing triangle meshes with normal directions that are perpendicular (e.g., within a predefined tolerance margin (e.g., ±30 degrees) to the vertical axis (e.g., (0, 0, 1)) according to an example embodiment is provided. Other techniques of interpolating non-vertical triangle vertices to produce a dense 3D point cloud(s) corresponding to a geographic area(s) of photogrammetry imagery may be performed by the texturized 3D segment model module 78 without departing from the spirit and scope of the invention.

For quick retrieval of location and neighborhood information, interpolated points may be stored in an octree (e.g., stored in a memory (e.g., memory device 76)) by the texturized 3D segment model module 78. Other structures may be utilized by the texturized 3D segment model module 78 for quick retrieval of location and neighborhood information in which interpolated points may be stored such as, for example, in a k-dimensional (kd)-tree without departing from the spirit and scope of the invention.

At operation 315, an apparatus (e.g., texturized 3D segment model module 78), may perform rooftop and ground segmentation by clustering interpolated points according to their geographic locations and relative distances to one another. As such, nearby points (e.g., 3D points) may be clustered and labeled (e.g., designated with identifying indicia (e.g., a color, a name, assigned a value, etc.)) by the texturized 3D segment model module 78. In this regard, a neighborhood distance may be predefined (e.g., 50 cm, 2 meters, etc.) by the texturized 3D segment model module 78 to determine nearby points. In an example embodiment, the texturized 3D segment model module 78 may traverse a cloud of 3D points and may assign similar labels (e.g., similar identifying indicia (e.g., a same color, a same name, assigned a same value, etc.) to points that geographically lie within the neighborhood predefined threshold distance (e.g., 50 cm, 2 meters, etc.), while assigning different labels to points (e.g., 3D points) determined to be located outside the neighborhood predefined threshold distance. As a result, points may be grouped according to their proximity by the texturized 3D segment model module 78, which may separate rooftops from one another since the walls that connected to the rooftops was marked and segmented out by the texturized 3D segment model module 78 in operation 305.

The texturized 3D segment model module 78 may separate the ground from other points (e.g., 3D points) by selecting the largest cluster of points within the predefined threshold distance out of all clustered points. In this regard, FIG. 8 illustrates an example of the resulting segmentation of the ground denoted by visible indicia 15 (also referred to herein as ground cloud 15 or ground 15) and the segmentation of rooftop points (also referred to herein as rooftops) designated by visible indicia 14 performed by the texturized 3D segment model module 78. The texturized 3D segment model module 78 may segment the ground in this manner in an instance in which a tested area (e.g., an area corresponding to the ground) is larger than any rooftop in the captured scene(s). Other approaches may be employed by the texturized 3D segment model module 78 to segment the ground such as, for example, by utilizing one or more Digital Terrain Maps. For example, a Digital Terrain Map (DTM) may be composed of a grid of elevation values constituting the ground elevation in a geographical area. In addition, building models may therefore refer directly to a DTM in order for the texturized 3D segment model module 78 to infer base elevation of the building models without departing from the spirit and scope of the invention.

At operation 320, an apparatus (e.g., texturized 3D segment model module 78) may compute the outline or delineation of each of the rooftops of FIG. 8. In an example embodiment, the texturized 3D segment model module 78 may compute the outline of each of the rooftops by computing a concave hull of each of the clustered cloud of points corresponding to the rooftops.

At operation 325, an apparatus (e.g., texturized 3D segment model module 78) may compute structure baselines. In this regard, the texturized 3D segment model module 78 may identify the points (e.g., 3D points) on the ground (e.g., ground 15) with respect to each of the rooftops. The identified points on the ground with respect to the rooftops may be designated as baselines (also referred to herein as structure baselines) by the texturized 3D segment model module 78. In this regard, the texturized 3D segment model module 78 may compute the height of structures (e.g., buildings) by determining the height of the rooftops to their corresponding baselines on the ground (e.g., ground 15).

At operation 330, an apparatus (e.g., texturized 3D segment model module 78) may project rooftop outlines down to the corresponding closest point(s) in the ground cloud 15. In this regard, the texturized 3D segment model module 78 may perform downward projection by analyzing 3D points in the sky corresponding to the rooftops and project downward from the rooftops to the ground 15. As such, the texturized 3D segment model module 78 may generate a set of polygonal models depicting 3D geographic (e.g., urban) objects, based on the downward projection, an example of which is shown in FIG. 9. In particular, FIG. 9 illustrates the models from down projecting rooftop outlines to a ground level (e.g., ground cloud 15).

Referring now to FIG. 10, a diagram illustrating a parenthood tree is provided according to an example embodiment. Since rooftops may have architectural details and parts that were separated during wall removal, the texturized 3D segment model module 78 may create a parenthood tree that encodes the relationship between rooftop parts, as shown in FIG. 10. The texturized 3D segment model module 78 may generate the parenthood tree 17 (e.g., a k-dimensional tree) by traversing a zero-height version of a rooftop/ground segmented cloud, starting from a point on the ground (e.g., ground 15) (for example, the ground was detected as being the largest segmented region), and analyzing each point(s) as well as corresponding points in each of the analyzed points vicinity with different segmentation labels. In this regard, the texturized 3D segment model module 78 may generate a zero-height version of a cloud that is a flat cloud of points in which each point has an assigned label created after rooftop segmentation.

In the example embodiment of FIG. 10, points may receive different segmentation labels because of their distance in space (e.g., height). In the flattened version of the cloud, generated by the texturized 3D segment model module 78, points may be adjacent in the Z=0 plane. In this regard, the texturized 3D segment model module 78 may infer vicinity from points that are separated in the Z-plane. Starting from a node that encodes the ground (e.g., ground 15), the texturized 3D segment model module 78 may add new nodes for each rooftop that has points touching one of the ground points. Subsequently, the texturized 3D segment model module 78 may add nodes under a rooftop node in the parenthood tree 17 for each rooftop part (that is not already in the parenthood tree 17) with touching points. Once all points in the cloud (e.g., a 3D cloud of points) are traversed/analyzed, by the texturized 3D segment model module 78, the parenthood tree 17 is complete and a full relational representation of the scene corresponding to the points of the cloud is created by the texturized 3D segment model module 78.

In an example embodiment, the texturized 3D segment model module 78 may generate the parenthood tree 17 of FIG. 10 in the following manner. The cloud of 3D points associated with the ground (also referred to herein as ground cloud) is traversed first and is assigned a node label "0" by the texturized 3D segment model module 78. Subsequently, the texturized 3D segment model module 78 may determine that rooftops "1" and "2" have touching points to the ground cloud and are added under node "0". Thereafter, the texturized 3D segment model module 78 analyzes and traverses cloud "1" and may determine that rooftops "3" and "4" touch. As such, rooftops "3" and "4" are added, by the texturized 3D segment model module 78, under node "1". The texturized 3D segment model module 78 may then analyze and traverse cloud "2" and detect touching rooftop "5", which may be added under node "2" by the texturized 3D segment model module 78. Thereafter, the texturized 3D segment model module 78 may analyze and traverse cloud "3" and detect touching rooftop "6", which may be added under node "3" by the texturized 3D segment model module 78. Subsequently, the texturized 3D segment model module 78 may analyze and traverse clouds "4", "5" and "6" and may determine that there are no touching rooftops, corresponding to clouds "4", "5" and "6", that are not already detected and included in the parenthood tree 17. In this manner, the parenthood tree 17 is completed by the texturized 3D segment model module 78. The parenthood tree 17 may be utilized by the texturized 3D segment model module 78 to reconnect rooftops that may have been disconnected during clustering of interpolated points according to their geographic locations and relative distances to one another (e.g., during operation 315).

At operation 335, an apparatus (e.g., texturized 3D segment model module 78) may perform texture mapping of structure (e.g., building) facades. In this regard, since the resulting 3D polygonal models, depicting 3D geographic (e.g., urban) models, lie where the 3D photogrammetry triangle meshes were geographically located, the texturized 3D segment model module 78 may match/map triangle texture locations associated with the triangle meshes to the corresponding 3D polygonal modeled facades (e.g., building models composed by a number of facades such as, for example, polygons) and may assign the corresponding texture to walls, rooftops and other structures of the corresponding 3D geographic (e.g., urban) models. In an example embodiment, the texturized 3D segment model module 78 may texture the 3D polygonal model(s) having locations matched/mapped with the corresponding triangle texture locations based in part on coloring and/or including other identifying information with each point (e.g., pixel(s)) of the locations of the 3D polygonal model(s). As such, the texturized 3D segment model module 78 may paint one or more structures (e.g., a building(s)) of the 3D polygonal model(s) based in part on performing a texture-mapping process. In this manner, at operation 340, an apparatus (e.g., texturized 3D segment model module 78) may produce and/or output one or more textured structure (e.g., building) models including a texturized set of 3D geographic (e.g., urban) objects as illustrated in FIGS. 11, 12, 13 and 14.

For example, FIG. 11 illustrates the result of texturizing models, generated by the texturized 3D segment model module 78, based on relative geographic location of mesh triangles and the modeled walls and rooftops of FIG. 9. FIG. 12 illustrates the result of texturizing models, generated by the texturized 3D segment model module 78, corresponding to a geographic area in San Francisco, Calif. In addition, FIG. 13 illustrates a close up view of the texturized models of FIG. 12, generated by the texturized 3D segment model module 78, corresponding to the geographic area in San Francisco, Calif.

Referring now to FIG. 14, a diagram illustrating a structure being selected among multiple structures of a texturized set of 3D geographic (e.g., urban) objects according to an example embodiment is provided. In the example embodiment of FIG. 12, the texturized 3D segment model module 78 may receive an indication of a selection of a structure 18 (e.g., a building) from the texturized set of 3D geographic objects 19. In an example embodiment, the texturized 3D segment model module 78 may receive the indication of the selection of the structure 18 in response to a user selecting the structure 18 from the texturized set of 3D geographic objects 19. In another example embodiment, the texturized 3D segment model module 78 may detect the indication of the selection of the structure 18 in response to identifying predefined preferences designating selection of a particular structure or a type of structure from the texturized set of 3D geographic objects 19. Since the texturized 3D geographic models are segmented from each other and geographically labeled, by the texturized 3D segment model module 78, each of the structures (e.g., buildings, trees, vegetation) may be individually selected and matched with other data sources (e.g., points of interest (POIs), historical facts, other information etc.).

For example, since the structures of the texturized 3D geographic models may be individually labeled and selectable, information (e.g., the name of the structure, POIs associated with the structure, historical facts, etc.) pertaining to a selectable structure(s) (e.g., a building(s)) may be output and/or displayed via the texturized 3D segment model module 78. In an example embodiment, the texturized 3D segment model module 78 may present the information associated with a corresponding selected structure (e.g., structure 18) superimposed on an image of the selected structure or superimposed on another area of the corresponding texturized 3D geographic models (e.g., texturized set of 3D geographic objects 19).

It should be pointed out that although rooftops and walls are described, for purposes of illustration and not of limitation, as examples of some of the structures (e.g., buildings) corresponding to 3D points of a cloud(s), other structures/features (e.g., trees, vegetation, etc.) may also be detected in 3D points of a cloud(s) by the texturized 3D segment model module 78. Additionally, the texturized 3D segment model module 78 may analyze modeled objects according to the distribution of points in a 3D space or the distribution of the variance of normal vectors of the points in 3D space. In this regard, trees, for example, may present a higher heterogeneity than manmade rooftops. In another example embodiment, the texturized 3D segment model module 78 may analyze the texture constitution of trees and other manmade constructions to separate the models structure. For example, trees may be composed of green areas that are spectrally distinct from manmade objects. Additionally, for a full 3D representation of the scene, ground level photogrammetry may be combined and utilized by the texturized 3D segment model module 78.

Referring now to FIG. 15, an example embodiment of a flowchart for generating texturized 3D geographical models is provided according to an example embodiment. At operation 1500, an apparatus 50 may include means, such as the texturized 3D segment model module 78, the processor 70 and/or the like, for removing one or more 3D points of a cloud depicting vertical structures (e.g., walls) in one or more meshes of 3D triangles detected in a geographic area (e.g., an urban area, a city) corresponding to a set of 3D points of the cloud in response to identifying corresponding triangles lying on the vertical structures. Each of the 3D triangles includes three vertices corresponding to geocoordinates (e.g., latitude, longitude, and altitude coordinates) of the geographic area.

At operation 1505, the apparatus 50 may include means, such as the texturized 3D segment model module 78, the processor 70 and/or the like, for interpolating non-vertical structures of the 3D triangles to generate additional 3D points of the cloud to generate a dense cloud of 3D points. In other words, by creating the additional 3D points, via the texturized 3D segment model module 78 and/or the processor 70, the density of 3D points of the cloud is increased. Optionally, at operation 1510, the apparatus 50 may include means, such as the texturized 3D segment model module 78, the processor 70 and/or the like, for segmenting rooftops (e.g., rooftops 7, 8, 9, 10 and 11) of the vertical structures (e.g., walls) detected in the geographic area in response to analyzing the set of 3D points of the cloud, based in part on separating each of the rooftops from another respective rooftop.

At operation 1515, the apparatus 50 may include means, such as the texturized 3D segment model module 78, the processor 70 and/or the like, for downward projecting delineated (e.g., outlined) points of segmented rooftops to respective closest points (e.g., points corresponding to the baseline of the ground 15) of a subset of the points of the cloud representing a ground (e.g., ground 15) to generate one or more 3D polygonal models depicting 3D geographical objects (e.g., buildings, trees, vegetation, etc.) At operation 1520, the apparatus 50 may include means, such as the texturized 3D segment model module 78, the processor 70 and/or the like, for generating a texturized set of the 3D geographic objects in response to mapping triangle texture locations of the meshes to corresponding locations in the 3D polygonal models and assigning at least one texture (e.g., color or other information (e.g., POIs, historical facts, a name of a structure, etc.)) to the vertical structures (e.g., walls) and to the rooftops (e.g., rooftops 7, 8, 9, 10 and 11).

It should be pointed out that FIGS. 3 and 15 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., processor 70, texturized 3D segment model module 78). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 3 and 15 above may comprise a processor (e.g., the processor 70, the texturized 3D segment model module 78) configured to perform some or each of the operations (300-340 and 1500-1520) described above. The processor may, for example, be configured to perform the operations (300-340 and 1500-1520) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (300-340 and 1500-1520) may comprise, for example, the processor 70 (e.g., as means for performing any of the operations described above), the texturized 3D segment model module 78 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    identifying one or more three dimensional triangles that lie on vertical structures, wherein (a) the one or more three dimensional triangles being of a plurality of three dimensional triangles organized into one or more meshes, (b) each of the three dimensional triangles of the plurality of three dimensional triangles comprises three vertices corresponding to geocoordinates of a geographic area, (c) a vertex defines a three dimensional point in a cloud, and (d) each of the three dimensional triangles of the plurality of triangles is assigned a texture patch;
    in response to identifying the one or more three dimensional triangles lying on the vertical structures, removing the one or more three dimensional points corresponding to the identified one or more three dimensional triangles from the cloud;
    interpolating, via a processor, non-vertical structures of the plurality of three dimensional triangles to generate additional three dimensional points of the cloud to generate a dense cloud of three dimensional points, wherein at least a portion of the dense cloud of three dimensional points has a higher density of three dimensional points than the cloud used to generate the dense cloud;
    assigning a segmentation label to the three dimensional points of the dense cloud and determining a relational model encoding a relationship between a first three dimensional point and a second three dimensional point based on the segmentation labels assigned to the first and second three dimensional points;
    downward projecting delineated points of segmented rooftops to respective closest points of a subset of the points of the cloud representing a ground to generate one or more three dimensional polygonal models depicting three dimensional geographical objects; and
    generating a texturized set of the three dimensional geographic objects in response to mapping triangle texture locations of the meshes to corresponding locations in the three dimensional polygonal models and assigning at least one texture to the vertical structures and to the rooftops, wherein the assignment of the at least one texture to a vertical structure or rooftop is based at least in part on the texture patch assigned to a three dimensional triangle corresponding to a polygon of the vertical structure or rooftop.

2. The method of claim 1, wherein prior to downward projecting the method further comprises:
    segmenting rooftops of the vertical structures detected in the geographic area in response to analyzing the set of three dimensional points of the cloud, based in part on separating each of the rooftops from another respective rooftop.

3. The method of claim 2, further comprising:
    indicating a selection of at least one of the objects, or information associated with the object, of the texturized set of three dimensional geographic objects in response to detection of a selection of the object from an output of a texturized model of the texturized set of three dimensional geographic objects.

4. The method of claim 1, wherein assigning the at least one texture further comprises:
    assigning one or more colors or other information to the vertical structures and to the rooftops.

5. The method of claim 1, wherein prior to removing the three dimensional points the method further comprises:
    receiving or accessing a set of photogrammetry imagery data corresponding to the geographic area, the photogrammetry imagery data comprises the meshes of the three dimensional triangles.

6. The method of claim 1, wherein interpolating further comprises:
    interpolating the non-vertical vertices by determining a centroid of the three vertices and equidistantly subdividing lines connecting the three vertices to each other and to the centroid to generate the additional three dimensional points.

7. The method of claim 1, wherein removing the three dimensional points further comprises:

removing the three dimensional points of the cloud depicting the vertical structures based in part on determining a normal direction of the three dimensional triangles.

8. The method of claim 7, wherein determining the normal direction further comprises:
determining a cross-product between two vectors formed by connecting one of the vertices to the other two vertices of the three vertices and detecting the normal direction of the triangles perpendicular to a vertical axis within a predetermined tolerance margin.

9. The method of claim 1, further comprising:
detecting that the geographic area comprises an urban area or a city.

10. An apparatus comprising:
at least one processor; and
at least one memory including computer program code, the at least one memory and the computer program code configured to, with the at least one processor, cause the apparatus to perform at least the following:
identify one or more three dimensional triangles that lie on vertical structures, wherein (a) the one or more three dimensional triangles being of a plurality of three dimensional triangles organized into one or more meshes, (b) each of the three dimensional triangles of the plurality of three dimensional triangles comprises three vertices corresponding to geocoordinates of a geographic area, (c) a vertex defines a three dimensional point in a cloud, and (d) each of the three dimensional triangles of the plurality of triangles is assigned a texture patch;
in response to identifying the one or more three dimensional triangles lying on the vertical structures, remove the one or more three dimensional points corresponding to the identified one or more three dimensional triangles from the cloud;
interpolate non-vertical structures of the plurality of three dimensional triangles to generate additional three dimensional points of the cloud to generate a dense cloud of three dimensional points, wherein at least a portion of the dense cloud of three dimensional points has a higher density of three dimensional points than the cloud used to generate the dense cloud;
assign a segmentation label to the three dimensional points of the dense cloud and determine a relational model encoding a relationship between a first three dimensional point and a second three dimensional point based on the segmentation labels assigned to the first and second three dimensional points;
downward project delineated points of segmented rooftops to respective closest points of a subset of the points of the cloud representing a ground to generate one or more three dimensional polygonal models depicting three dimensional geographical objects; and
generate a texturized set of the three dimensional geographic objects in response to mapping triangle texture locations of the meshes to corresponding locations in the three dimensional polygonal models and assigning at least one texture to the vertical structures and to the rooftops, wherein the assignment of the at least one texture to a vertical structure or rooftop is based at least in part on the texture patch assigned to a three dimensional triangle corresponding to a polygon of the vertical structure or rooftop.

11. The apparatus of claim 10, wherein prior to downward project, the memory and computer program code are configured to, with the processor, cause the apparatus to:
segment rooftops of the vertical structures detected in the geographic area in response to analyzing the set of three dimensional points of the cloud, based in part on separating each of the rooftops from another respective rooftop.

12. The apparatus of claim 11, wherein the memory and computer program code are configured to, with the processor, cause the apparatus to:
indicate a selection of at least one of the objects, or information associated with the object, of the texturized set of three dimensional geographic objects in response to detection of a selection of the object from an output of a texturized model of the texturized set of three dimensional geographic objects.

13. The apparatus of claim 10, wherein the memory and computer program code are configured to, with the processor, cause the apparatus to:
assign the at least one texture by assigning one or more colors or other information to the vertical structures and to the rooftops.

14. The apparatus of claim 10, wherein prior to remove the three dimensional points, the memory and computer program code are configured to, with the processor, cause the apparatus to:
receive or access a set of photogrammetry imagery data corresponding to the geographic area, the photogrammetry imagery data comprises the meshes of the three dimensional triangles.

15. The apparatus of claim 10, wherein the memory and computer program code are configured to, with the processor, cause the apparatus to:
interpolate by interpolating the non-vertical vertices by determining a centroid of the three vertices and equidistantly subdividing lines connecting the three vertices to each other and to the centroid to generate the additional three dimensional points.

16. The apparatus of claim 10, wherein the memory and computer program code are configured to, with the processor, cause the apparatus to:
remove the three dimensional points by removing the three dimensional points of the cloud depicting the vertical structures based in part on determining a normal direction of the three dimensional triangles.

17. The apparatus of claim 16, wherein the memory and computer program code are configured to, with the processor, cause the apparatus to:
determine the normal direction by determining a cross-product between two vectors formed by connecting one of the vertices to the other two vertices of the three vertices and detecting the normal direction of the triangles perpendicular to a vertical axis within a predetermined tolerance margin.

18. The apparatus of claim 10, wherein the memory and computer program code are configured to, with the processor, cause the apparatus to:
detect that the geographic area comprises an urban area or a city.

19. A computer program product comprising at least one non-transitory computer-readable storage medium having computer-readable program code portions stored therein, the computer-readable program code portions comprising:
program code instructions configured to identify one or more three dimensional triangles that lie on vertical structures, wherein (a) the one or more three dimensional triangles being of a plurality of three dimensional triangles organized into one or more meshes, (b) each of the three dimensional triangles of the plurality of three dimensional triangles comprises three vertices corresponding to geocoordinates of a geographic area, (c) a vertex defines a three dimensional point in a cloud, and (d) each of the three dimensional triangles of the plurality of triangles is assigned a texture patch;

program code instructions to, in response to identifying the one or more three dimensional triangles lying on the vertical structures, remove the one or more three dimensional points corresponding to the identified one or more three dimensional triangles from the cloud;

program code instructions configured to interpolate non-vertical structures of the plurality of three dimensional triangles to generate additional three dimensional points of the cloud to generate a dense cloud of three dimensional points, wherein at least a portion of the dense cloud of three dimensional points has a higher density of three dimensional points than the cloud used to generate the dense cloud;

program code instructions configured to assign a segmentation label to the three dimensional points of the dense cloud and determine a relational model encoding a relationship between a first three dimensional point and a second three dimensional point based on the segmentation labels assigned to the first and second three dimensional points;

program code instructions configured to downward project delineated points of segmented rooftops to respective closest points of a subset of the points of the cloud representing a ground to generate one or more three dimensional polygonal models depicting three dimensional geographical objects; and program code instructions configured to generate a texturized set of the three dimensional geographic objects in response to mapping triangle texture locations of the meshes to corresponding locations in the three dimensional polygonal models and assigning at least one texture to the vertical structures and to the rooftops, wherein the assignment of the at least one texture to a vertical structure or rooftop is based at least in part on the texture patch assigned to a three dimensional triangle corresponding to a polygon of the vertical structure or rooftop.

20. The computer program product of claim 19, wherein prior to downward project, the computer program product further comprises:

program code instructions configured to segment rooftops of the vertical structures detected in the geographic area in response to analyzing the set of three dimensional points of the cloud, based in part on separating each of the rooftops from another respective rooftop.

* * * * *